(12) United States Patent
He (10) Patent No.: US 7,412,124 B1
(45) Date of Patent: Aug. 12, 2008

(54) OPTICAL MODULE WITH HIGH REFLECTION ISOLATION AND COMPACT SIZE

(75) Inventor: Chun He, Frement, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 133 days.

(21) Appl. No.: 10/871,215

(22) Filed: Jun. 18, 2004

(51) Int. Cl.
*G02B 6/26* (2006.01)
*G02B 6/42* (2006.01)

(52) U.S. Cl. .............................. 385/20; 385/24; 385/46

(58) Field of Classification Search ................... 385/20, 385/46
See application file for complete search history.

(56) References Cited

U.S. PATENT DOCUMENTS

| | | | |
|---|---|---|---|
| 5,629,995 A | 5/1997 | Duck | |
| 5,812,291 A * | 9/1998 | Bendelli et al. ............... | 398/85 |
| 6,188,816 B1 | 2/2001 | Solheim | |
| 6,198,857 B1 | 3/2001 | Grasis et al. | |
| 6,408,115 B1 * | 6/2002 | McIntyre ...................... | 385/33 |
| 6,466,341 B1 | 10/2002 | Lumish et al. | |
| 6,597,837 B2 * | 7/2003 | Xiaofan ........................ | 385/33 |
| 6,792,210 B1 * | 9/2004 | Hallock et al. ................ | 398/83 |
| 6,816,645 B2 * | 11/2004 | Tai ............................... | 385/34 |
| 7,031,610 B2 * | 4/2006 | Honda et al. .................. | 398/85 |
| 2001/0055442 A1 | 12/2001 | Whitehead | |
| 2003/0228101 A1 | 12/2003 | Tai | |

* cited by examiner

*Primary Examiner*—Frank G Font
*Assistant Examiner*—Erin D Chiem
(74) *Attorney, Agent, or Firm*—Joe Zheng (57) ABSTRACT

Techniques for designing optical devices with high reflection isolation are disclosed. According to one aspect of the devices, a pair of conjugate optical filters is used. To preserve the performance of the filters and minimize insertion loss, a lens has a first side and a second side, the first side being preferably perpendicular to an optical axis of the lens, and the second side being nearly perpendicular to the optical axis of the lens. Thus one of the conjugate optical filters is deposed towards the first side of the lens and the other one of the conjugate optical filters is deposed towards the second side of the lens. When a reflected light from one filter, presumably carrying residuals of a transmitted signal, hits another filter, the residuals are blocked, resulting in great isolation for the R-channel from the T-channel.

17 Claims, 7 Drawing Sheets

OPTICAL MODULE WITH HIGH REFLECTION ISOLATION AND COMPACT SIZE

CROSS-REFERENCE TO RELATED APPLICATION

This application is related to U.S. patent application Ser. No. 10/600,105, filed Jun. 20, 2003, and entitled "Fiber optic collimators", which is hereby incorporated by reference.

BACKGROUND OF THE INVENTION

1. Field of the Invention

The invention is generally related to the area of optical communications. In particular, the present invention is related to optical wavelength multiplexing or add/drop devices with high reflection channel isolation and the method for making the same in compact size.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multi-channel signal for dropping a wavelength while simultaneously adding a channel with a matching wavelength at the same network node. Likewise, for transmission through a single fiber, a plurality of channel signals are combined via a multiplexer to be a multiplexed signal that eventually separated or demultiplexed via a demultiplexer.

Figure 1A:
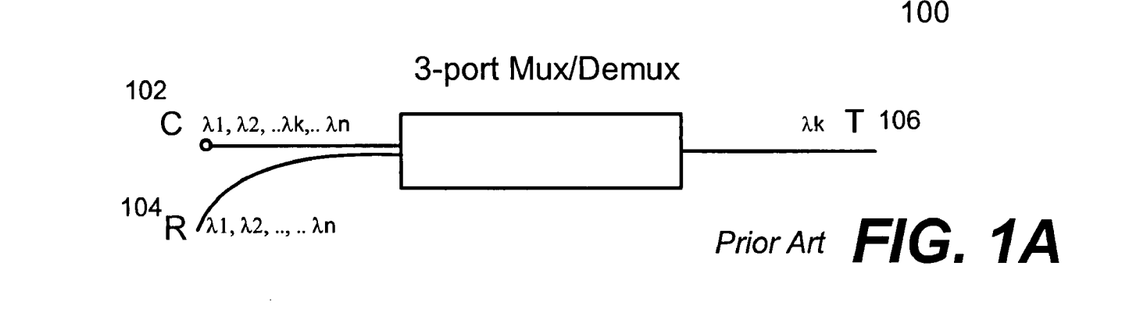
FIG. 1A shows a typical design of a three-port add/drop device.

A fundamental element in add/drop devices and multiplexer/demultiplexer is what is called a three-port device. As the name suggests, a three-port device has three ports, each for a multi-channel signal, a dropped or added signal or a multi-channel signal without the dropped or added signal. FIG. 1A shows a typical design of a three-port add/drop device 100. The optical device 100 includes a common (C) port 102, a reflection (R) port 104, and a transmission (T) port 106. When the device 100 is used as a multiplexer (i.e., to add a signal at a selected wavelength $\lambda_K$ to other signals at wavelengths other than the selected wavelength $\lambda_K$), the T-port 106 receives a light beam at the selected wavelength $\lambda_K$ that is to be multiplexed into a group of beams at wavelengths $\lambda_1$, $\lambda_2$, ... $\lambda_N$ excluding the selected wavelength $\lambda_K$ coupled in from the C-port 102. The R-port 104 subsequently produces a multiplexed signal including all wavelengths $\lambda_1$, $\lambda_2$, ... $\lambda_K$, ... $\lambda_N$.

Likewise, when the optical device 100 is used to demultiplex signals, the C-port 102 receives a group of signals with wavelengths $\lambda_1$, $\lambda_2$, ... $\lambda_K$, ... $\lambda_N$. The T-port 106 produces a signal with the selected wavelength $\lambda_K$ while the R-port 104 subsequently produces a group of signals including all wavelengths $\lambda_1$, $\lambda_2$, ... $\lambda_N$ except for the selected wavelength $\lambda_x$. In general, the optical paths towards a R-port and a T-port are respectively referred to as R-channel and T-channel.

Figure 1B:
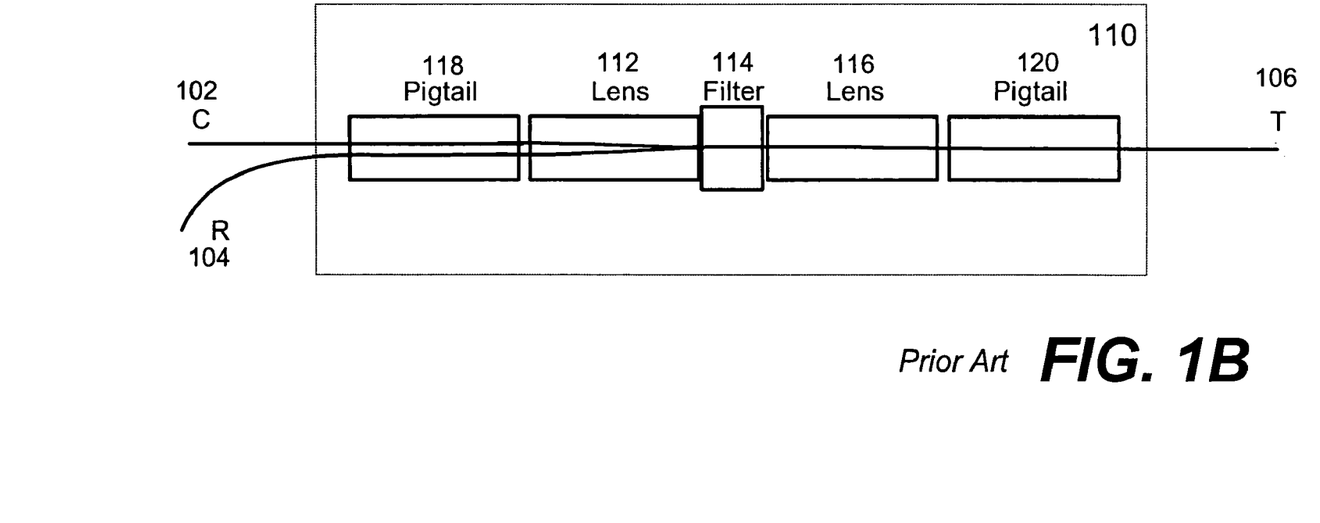
FIG. 1B shows an exemplary internal configuration of the optical device of FIG. 1A.

FIG. 1B shows an exemplary internal configuration 110 of the optical device 100 of FIG. 1A. As shown in FIG. 1B, there is a first GRIN lens 112, an optical filter 114 (e.g., a multilayer thin film filter) and a second GRIN lens 116. In general, a dual-fiber pigtail is provided in a holder 118 (e.g., a dual-fiber pigtail collimator) and coupled to or positioned towards the first GRIN lens 112, and a single-fiber pigtail is provided in a second holder 120 and coupled to or positioned towards the second GRIN lens 116. Essentially the two GRIN lenses 112 and 116 accomplish the collimating means for coupling an optical signal with multi channels or wavelengths in and out of the C port 102, the R port 104, or the T port 106. In general, the three-port device 100 is known to have a very low coupling loss from the C-port to both the R-port and the T-port for use as a demultiplexing device, or vise versa as a multiplexing device.

Figure 2A:
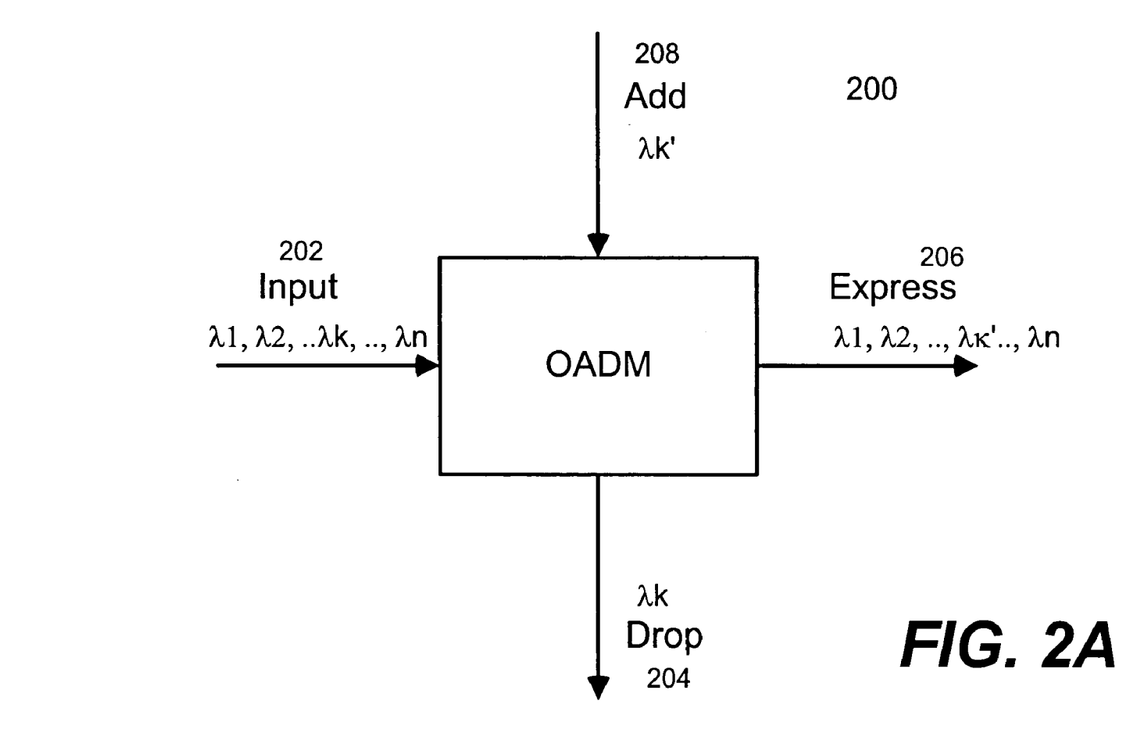
FIG. 2A shows a four-port device and respective functions of the four ports labeled, respectively.

As a result, the three-port device 100 is often used to assemble a four-port thin film interference filter based optical wavelength add/drop device. FIG. 2A shows a four-port add/drop device 200 and respective functions of the four ports labeled, respectively. An incoming network fiber provides a light beam including wavelength division multiplexed (WDM) optical signals, for example, with or at wavelengths $\lambda_1, \lambda_2, \ldots, \lambda_k, \ldots \lambda_n$, to an input port 202 of the device 200. A predetermined signal channel which is carried by a wavelength $\lambda_k$ is dropped, for example, to a local site for use through a drop port 204. At the same time, a new signal at a wavelength $\lambda_k'$ that is identical or substantially similar to the dropped wavelength $\lambda_k$ is coupled to an add port 208. A newly combined or multiplexed signal including wavelengths $\lambda_1$, $\lambda_2, \ldots, \lambda_k' \ldots \lambda_n$ is out from an express port 206.

Figure 2B:
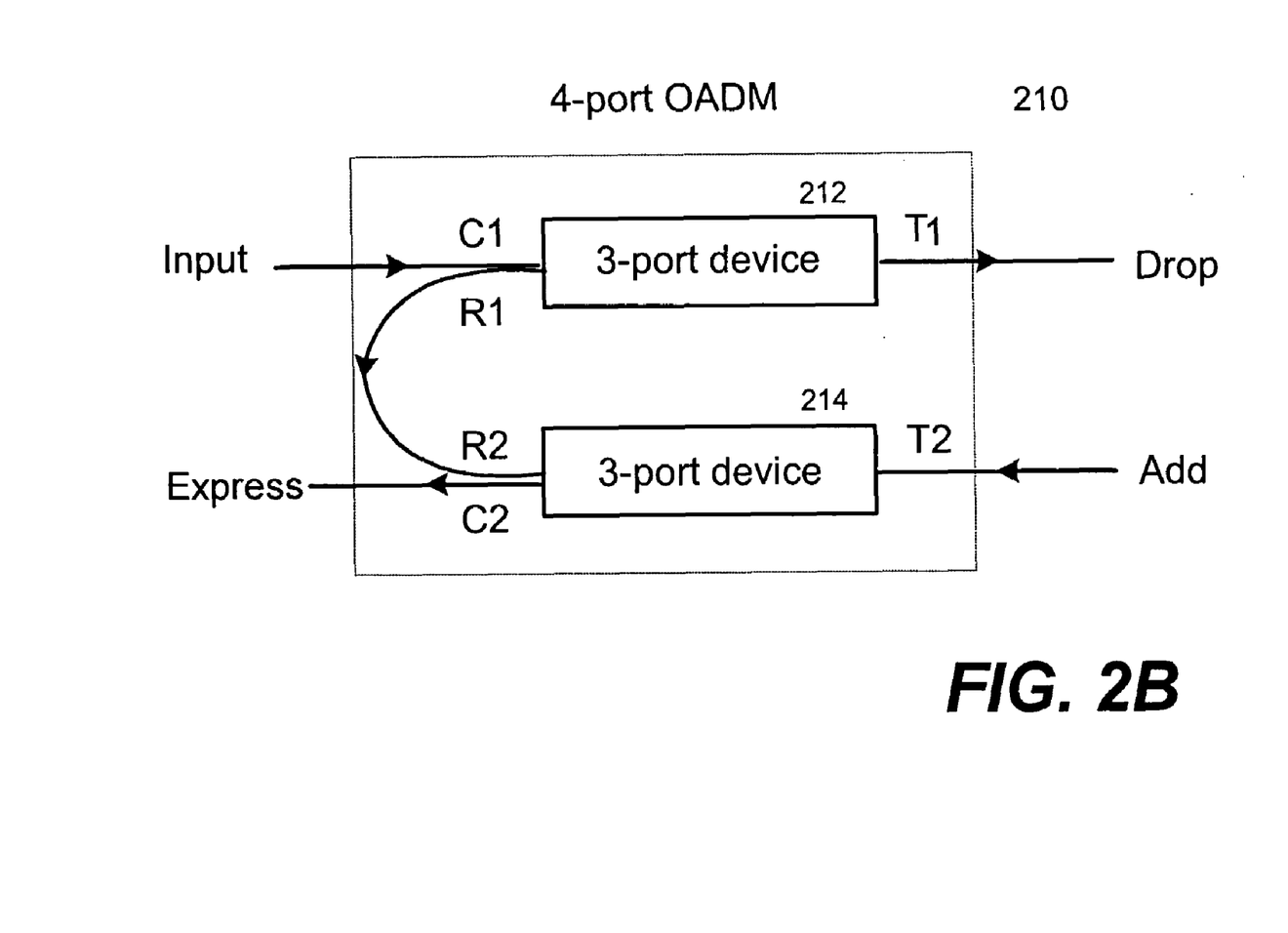
FIG. 2B shows an internal configuration employing two three-port devices, such as the one of FIG. 1B.

Traditionally, the four port device 200 is made by cascading two three-port devices. FIG. 2B shows an internal configuration 210 employing two three-port devices 212 and 214, such as the one 100 of FIG. 1B. Essentially, the three-port devices 212 and 214 are cascaded to form a four port add/drop device.

In general, the optical filters (e.g., thin film filter or TFF) can achieve nearly 100% reflection for the R-channel. For instance, TFF with a reflection index of 99.99% to 99.999% can be routinely achieved and commercially available. This is equivalent to 40 dB to 50 dB isolation for the T-channel from the R-channel. In other words, the mount of residual signal of the R channel transmitted through the TFF and mixed into the T-channel signal is −40 dB to −50 dB of the R-channel signal. The signal exiting the T-port of the 3-port device contains basically the pure T-channel signal, with the R-channel signal residual of −40 dB to −50 dB of its original signal intensity.

However, the optical filters by the state-of-art TFF deposition technique can only achieve 97.5% to 99% transmission for the T-channel signal. This is equivalent to 15 dB to 20 dB isolation for the R-channel signal from the T-channel signal. The signal exiting the R-port of the 3-port device contains not only R-channel signal, but also some residual of the T-channel signal that can be of −15 dB to −20 dB of its original signal intensity. As a result, the residual of the T-channel signal would interfere with the R-channel signal, especially when a new signal is added into the transmission fiber that is using the same T-channel optical carrier signal, leading to complexity and difficulty when processing the R-channel signal.

Figure 3:
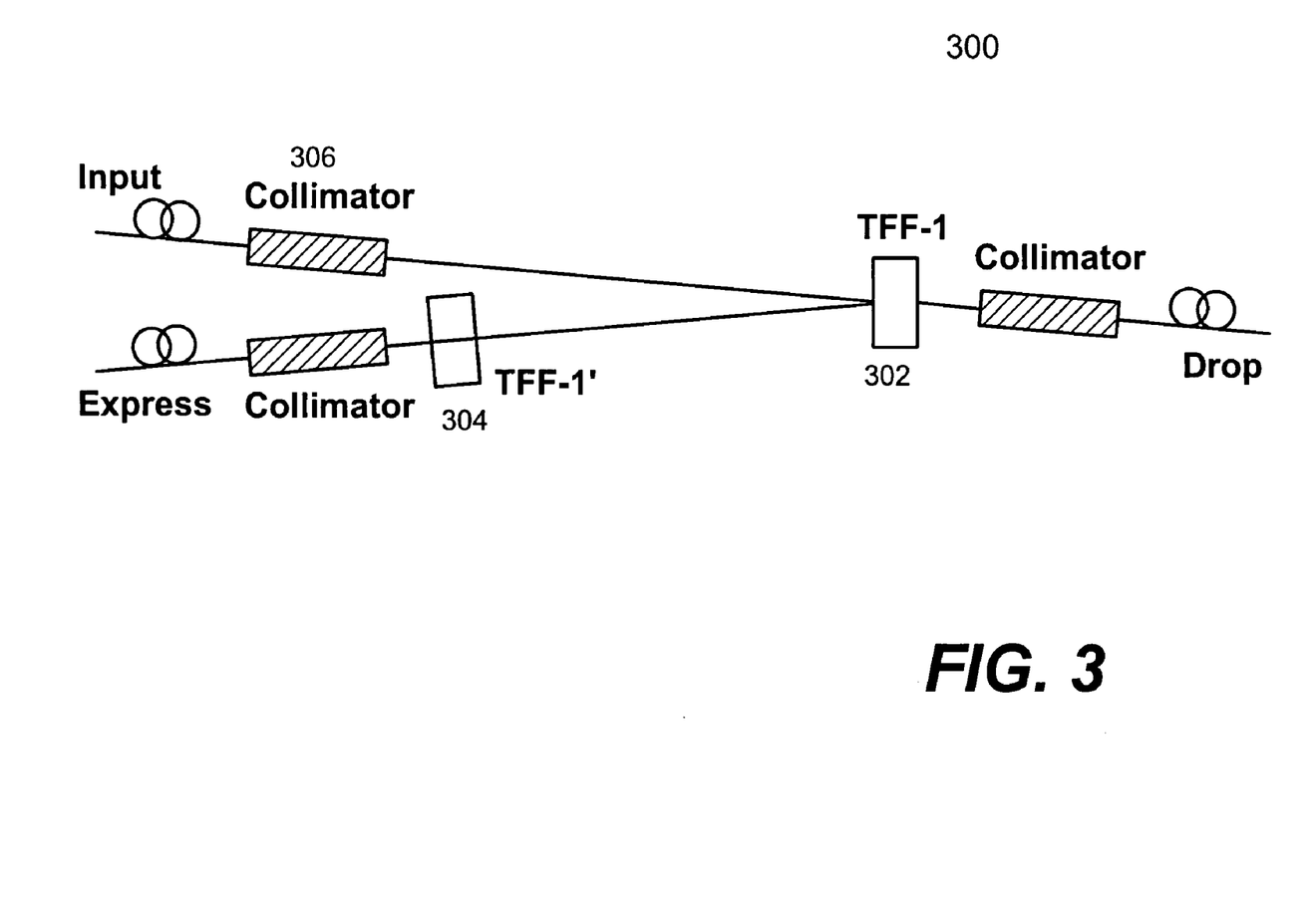
FIG. 3 shows a common approach using a pair of conjugate filters with the corresponding spectral characteristics reciprocal to each other to increase the isolation from the R-channel from the T-channel.

To increase the isolation for the R-channel signal from the T-channel signal, several methods have been used for removing the T-channel signal residual in the R-channel signal. One approach that is commonly adopted is to use a pair of conjugate filters with the corresponding spectral characteristics are reciprocal to each other. FIG. 3 shows one of the practical implementation of the above idea. The filters 302 and 304 are deposited with multiplayer coatings to allow transmitting only wavelength λ1 and λ2, respectively. When a light beam including signals at various wavelengths including λ1 and λ2 is coupled by the collimator 306 to the filter 302, a substantial portion of the signal at λ1 passes the filter 302, and at the same time, nearly all the signal λ2 and the residual portion of λ1 are reflected to the filter 304. The reflected light beam then impinges upon the filter 304 that transmits only a signal at λ2. As a result, the signal at λ2 is pure and is isolated from possible interference. Although this approach increases the R-channel isolation, this approach demands stringent assembling tolerance and technical challenge. In addition, the high isolation device build in such way suffers high cost and bulky size.

Figure 4:
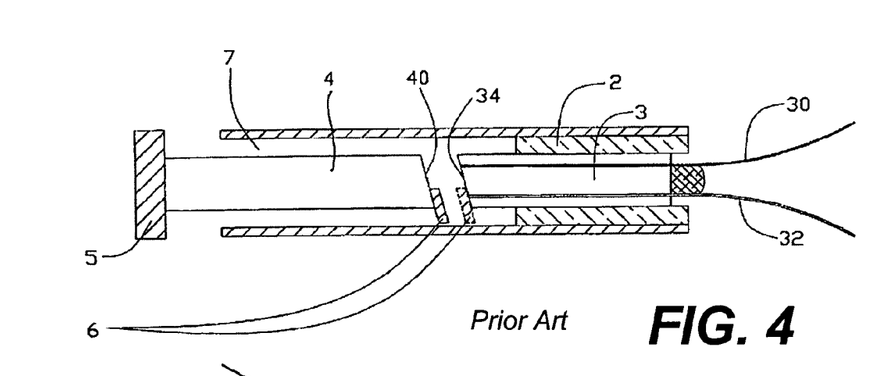
FIG. 4 duplicates FIG. 1 of US Patent Application publication 2003/0228101 in which a filter is attached to an end surface of a fiber or a rear face of a GRIN lens.

US Patent Application publication 2003/0228101 discloses the use of multiple filters in a compact package form. FIG. 4 duplicates FIG. 1 of US Patent Application publication 2003/0228101 in which a filter is attached to an end surface 34 of a second fiber or a rear face 40 of a GRIN lens 4. In operation, an incoming light signal includes two wavelength $\lambda_1, \lambda_2$ and travels from the first fiber 30 through the GRIN lens 4, then reaches the first filter 5. The first filter 5 is designed to just pass a light with a wavelength of $\lambda_1$. The light of wavelength $\lambda_1$ goes through the first filter 5 to reach another device, for example, a single fiber collimator. The light signal reflected by the first filter 5 then goes back through the GRIN lens 4 and reaches the second filter 6. The second filter 6 is designed to just pass a light only with a wavelength of $\lambda_2$. The light of wavelength $\lambda_2$ goes through the second filter 6 and travels along the second fiber 32 to another device for further processing.

In other words, the two filters 5 and 6 are conjugate. The second or conjugate filter 6 is deposited either on the end facet 40 of the R-channel fiber or the surface 34 of the fiber 32. The film filter deposited there has to be thin enough so that it can be fit into an air gap between the dual fiber pigtail 3 and the R-channel lens 4. The gap thickness is typically in the range of few tens micrometers to a few hundreds micrometers. This approach has the advantage of enjoying the same compact size and reliability as the standard three-port devices. However, the performance is not as desirable as the free-space approach shown in FIG. 3.

Figure 5:
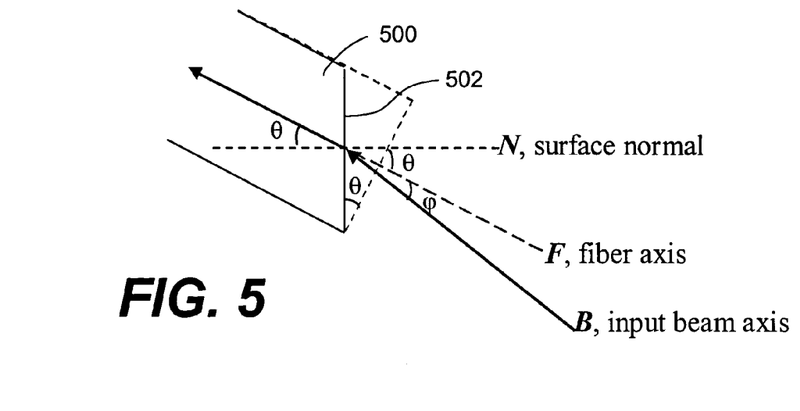
FIG. 5 shows relationships among a slanted angle θ, an offset angle φ, and a fiber (mechanical) axis of a fiber with a slanted facet.

Generally, a fiber end facet is made to have a slanted angle θ for the purpose of reducing back reflection. Typically, the slanted angle θ=8° is widely adopted, but the angle is not always confined to 8°. With such slanted angle, the returned light imaged onto the R-channel fiber is no longer aligned with the mechanical axis of the R-channel fiber, resulting in an offset angle of ϕ=3.65°, when the light wavelength is near 1.5 μm and when the fiber core index is 1.45. FIG. 5 shows the relationships of the slanted angle θ, the offset angle ϕ, and the fiber (mechanical) axis of a fiber 400 with a slanted facet 402.

Figure 6:
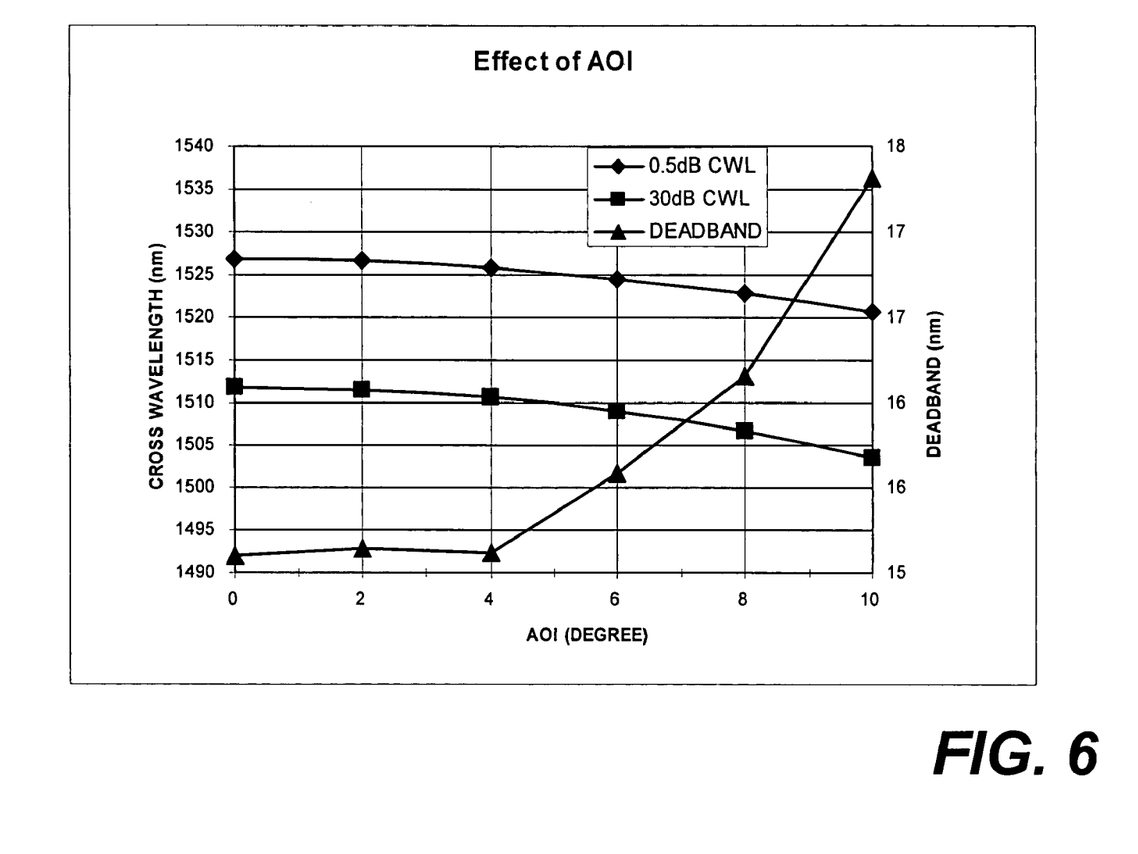
FIG. 6 shows relationships of the deadband and cross wavelength with a changing light incident angle.

Because of the slanted facet, the light incident angle on the filter is 8°+3.65°≈12°. As a result, the filter performance is severely degraded when the light incident is at such high range, as it is known in the art that the filter performance depends on the light incident angle. FIG. 6 is a testing result, clearly showing the deadband increase as the result of incident angle increasing from 0° to 10°. It is also clear that the deadband increases non-linearly with the incident angle: when the incident angle is very small, the deadband is the same; while after 4°, the deadband increases dramatically with the further increase of the incident angle. For many fiber optic telecommunication applications, such as the fiber to the home (FTTH) applications, it requires that a deadband of a filter (e.g., thin film filter or TFF) is no more than 35-50 nm with isolation better than 40 dB, wherein a deadband is referred to a region between a stopband and a passband of the spectrum of the filter. Practically, it is difficult to meet the requirements when the light incident angle is at ~12°.

Accordingly, there is a great need for techniques for providing high isolation from the T-channel channel such that the errors or residuals to the R-channel are minimized. The devices so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. For simplicity, a group of selected wavelengths or channels will be deemed or described as a selected wavelength hereinafter. According to one aspect of the present invention, a pair of conjugate optical filters is used, wherein a pair of conjugate optical filters means a particular wavelength transmitted by one of the two filters is blocked by the other one of the two filters. To preserve the performance of the filters and minimize insertion loss, a lens has a first side and a second side, a lens has a first side and a second side, the first side being preferably perpendicular to an optical axis of the lens, and the second side being nearly perpendicular to the optical axis of the lens. Thus one of the conjugate optical filters is deposed towards the first side of the lens and the other one of the conjugate optical filters is deposed towards the second side of the lens.

The present invention may be used in many areas such as optical communications and devices. For example, devices designed in accordance with the present invention can be used in applications of fiber to home, where in both the optical network unit (ONU) in a user end, as well as the optical line termination (OLT) in the network transmission end, high isolations between the high intensity video signal and the bi-directional downstream and upstream voice/data signals are highly demanded.

The present invention may be implemented in many ways as a subsystem, a device or a method. According to one embodiment, the present invention is an optical apparatus comprising, a lens with a first side and a second side, the second side being nearly perpendicular to an optical axis of the lens; a first optical filter deposed towards the first side of the lens; and a second optical filter deposed towards the second side of the lens, wherein the first optical filter and the second optical filter are conjugate in respective spectrum responses. The optical apparatus further includes a fiber with a facet toward the second side of the lens, wherein, the fiber includes at least two cores, one for a C-Channel and the other for a R-Channel.

According to another embodiment, the present invention is method for an optical apparatus, the method comprising providing a lens with a first side and a second side, the second side being nearly perpendicular to an optical axis of the lens; deposing a first optical filter towards the first side of the lens; and deposing a second optical filter towards the second side of the lens, wherein the first optical filter and the second optical filter are conjugate in respective spectrum responses.

One of the objects, features, advantages of the present invention is to provide a mechanism of high isolation for the R-channel from the T-channel channel such that the errors or residuals to the R-channel are minimized. The devices so designed are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of optical devices particularly useful for adding or dropping a selected wavelength or a group of wavelengths as well as multiplexing a plurality of signals into a multiplexed signal or demultiplexing a multiplexed signal into several signals. One of the important features in the present invention is to provide a mechanism for high isolation of signals in one optical path from signals in another optical path. In particular, high isolation of the R-channel from the T-channel is provided in devices designed in accordance with the present invention to minimize errors or residuals of the T-channel in the R-channel signals.

According to one aspect of the present invention, a pair of conjugate optical filters is used. To preserve the performance of the filters and minimize possible Insertion loss, a lens has a first side and a second side, the first side being preferably perpendicular to an optical axis of the lens, and the second side being nearly perpendicular to the optical axis of the lens. Thus one of the conjugate optical filters is deposed towards the first side of the lens and the other one of the conjugate optical filters is deposed towards the second side of the lens. When a reflected light from one filter, presumably carrying residuals of a transmitted signal, hits another filter, the residuals are blocked, resulting in great isolation for the R-channel from the T-channel.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 7:
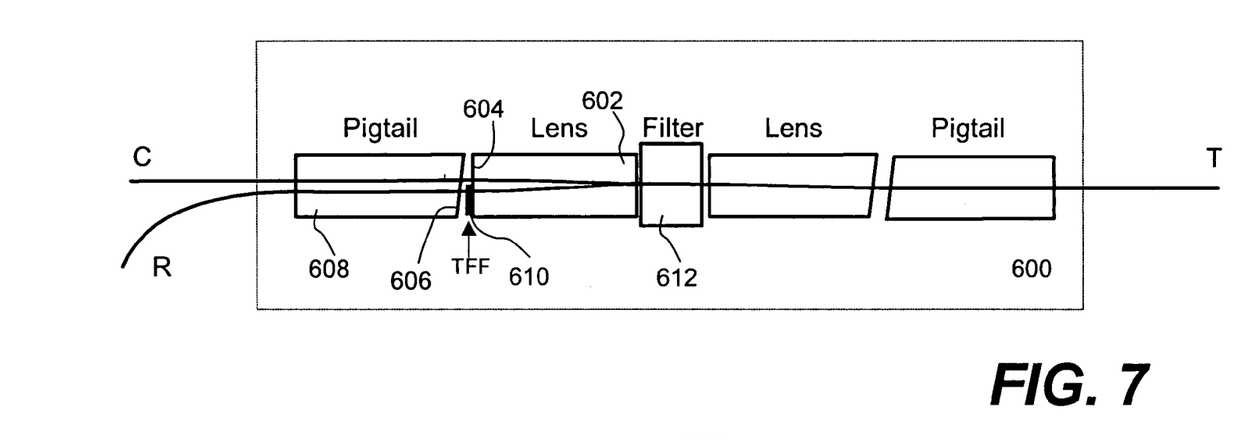
FIG. 7 shows an exemplary design according to one embodiment of the present invention.

Referring now to the drawings, in which like numerals refer to like parts throughout the several views. FIG. 7 shows an exemplary design 600 according to one embodiment of the present invention. One of the key features in the present invention is to provide high isolation of the R-channel from the T-channel. As shown in the design 600 and significantly different from the lens used in the prior art systems, the lens 602 is not slanted. Essentially, the end surface or back facet 604 of the lens 602 is made perpendicular, or maintained at a very small angle with respect to the optical axis of the lens 602 while the facet 606 of the pigtail fiber 608 remains slanted. It should be noted that the optical axis and mechanical axis of the lens 602 are coincidental.

From another perspective, both the front facet 606 and the back facet 604 are oriented non-congruently with respect to the optical axis of the lens 602. According to one aspect of the present invention, an optical filter 610 (e.g., a thin film filter) is deposed in the optical path of the R-channel. According to one embodiment as shown in FIG. 7, the optical filter 610 is deposed towards or attached to the non-slanted facet 604 of the lens 602.

In operation, a multiplexed signal or a light beam is coupled to a fiber labeled by C in FIG. 7. The light beam including signals with or at various wavelengths $\lambda_1, \lambda_2, \ldots, \lambda_k, \ldots \lambda_n$ and transmits through the lens 602 and impinges upon the optical filter 612. In one embodiment, the optical filter is a thin film filter. It is assumed that the optical filter 612 is configured to transmit a wavelength $\lambda_k$, thus a signal at wavelength $\lambda_k$ passes through the optical filter 612 and the rest of the signals at wavelengths at $\lambda_1, \lambda_2, \ldots \lambda_n$, excluding the wavelength $\lambda_k$, is reflected by the optical filter 612 and continue on the optical path of the R-Channel.

As the filter 610 configured to pass wavelengths other than the wavelength $\lambda_k$ is positioned in the optical path of the R-Channel. As a result, the residual of the wavelength $\lambda_k$ in the reflected signal is blocked, thus improving the isolation of the reflected signal from the transmitted signal at the wavelength $\lambda_k$. In another perspective, errors or residuals in the reflected light beam are reduced by transmitting the reflected signal while blocking the errors or residuals.

Figure 8:
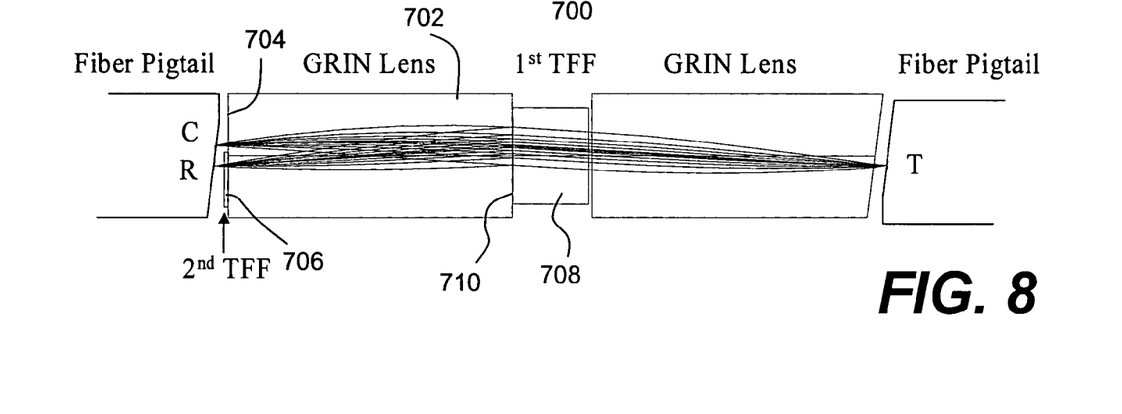
FIG. 8 shows another view of an embodiment with ray tracing in accordance with the present invention.

According to one aspect of the present invention, as shown in FIG. 8, a lens 702 (e.g., a GRIN lens) has its back facet 704 substantially non-slanted (e.g., with a zero or substantially small angle). A filter 706 with a thin substrate is attached to the back facet 704 of the lens 702 and is deposed only in the optical path of a reflected light from a filter 708 attached to the front facet 710 of the lens 702. The light incident angle onto the filter 706 is at the range of 1.8° to 4°, essentially the same as the light incident angle onto the second filter. The exact angle depends on the separation between the C-Channel and the R-Channel, and the focal length of the lens 702. At this incident angle, the present TFF deposition techniques can readily achieve >40 dB isolation with a deadband no more than 35-40 nm.

It should be appreciated by those skilled in the art that there are a number of ways to place optical filters in the device shown in FIG. 7 or 8. In one embodiment, a pair of thin film filters is respectively attached to both sides of a lens with one of the filters deposed only in the way of the R-Channel. In another embodiment, a lens may also be partially coated so that only the input light path or the output path is experiencing the coating (i.e., the filtering).

The present invention may be implemented in many ways, for example, as an apparatus, a system or a method and provides flexibilities in assembling final devices. According to one embodiment of the present invention, the position of the filter 610 of FIG. 7 can be inserted or adjusted after the optical part 600 is nearly in place. As a result, the stringent requirements in assembling such optical devices are much relaxed. In addition, it is appreciated by those skilled in the art that the optical devices so designed in accordance with the present invention are amenable to compact size and lower cost as there are one filter, one single fiber collimator, and one dual-fiber collimator, and a mirror.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, more reflective elements may be added to increase the times that the reflected light beam hits the same optical filter or a plurality of similar type of filters. Accordingly, the scope of the present invention is defined by the appended claims rather than the forgoing description of embodiments.

I claim:

1. An optical apparatus comprising:
   a first lens with a first side and a second side, the first side being perpendicular to an optical axis of the lens, and the second side being made slightly slanted or perpendicular to the optical axis of the lens;
   a fiber with a facet towards the second side of the first lens, the facet of the fiber being so slanted that the facet of the fiber and the second side of first the lens are non-congruent with respect to the optical axis of the lens;
   a second lens disposed coaxially with the first lens;
   a first optical filter disposed between the first lens and the second lens and towards the first side of the lens; and
   a second optical filter disposed towards the second side of the first lens and covering only a portion of the second side of the first lens such that a light beam coming from the fiber is coupled to the first lens without having to go through the second optical filter while a reflected light beam from the first optical filter impinges right into the second filter, wherein the first optical filter and the second optical filter are conjugate in respective spectrum responses, and wherein the second filter is provided to block possible residuals in a signal from the first optical filter to achieve a high degree of isolation.

2. The optical apparatus of claim 1, wherein the first optical filter is configured to transmit a particular wavelength, and the second optical filter transmits wavelengths other than the particular wavelength.

3. The optical apparatus of claim 1, wherein both of the first optical filter and the second optical filter are thin film filters.

4. The optical apparatus of claim 1, wherein either one of the first optical filter and the second optical filter is attached to the lens.

5. The optical apparatus of claim 4, wherein either one of the first optical filter and the second optical filter is a coating on the lens.

6. The optical apparatus of claim 1, wherein the fiber is a pigtail fiber.

7. The optical apparatus of claim 1, wherein the fiber includes at least two cores, one for a C-channel and the other for a R-Channel.

8. The optical apparatus of claim 1, further including means for positioning the lens, the first optical filter, the second optical filter, and the fiber.

9. A method for an optical apparatus, the method comprising:
   providing a first lens with a first side and a second side, the first side being perpendicular to an optical axis of the lens, and the second side being made slightly slated or perpendicular to the optical axis of the lens;
   providing a fiber with a facet towards the second side of the first lens, the facet of the fiber being so slanted that the facet of the fiber and the second side of the lens are non-congruent with respect to the optical axis of the lens;
   providing a second lens disposed coaxially with the first lens;
   disposing a first optical filter between the first lens and the second lens;
   disposing a second optical filter towards the second side of the lens and covering only a portion of the second side of the first lens such that a light beam coming from the fiber is coupled to the first lens without having to go through the second optical filter while a reflected light beam from the first optical filter impinges right into the second filter, the first optical filter and the second optical filter are conjugate in respective spectrum responses, wherein the second filter is provided to block possible residuals in a signal from the first filter.

10. The method of claim 9, wherein the first optical filter is configured to transmit a particular wavelength, and the second optical filter transmits wavelengths other than the particular wavelength.

11. The method of claim 9, further including bonding the lens, the first optical filter, the second optical filter, and the fiber.

12. The method of claim 9, further including positioning the lens, the first optical filter, the second optical filter, and the fiber in a tube.

13. The method of claim 9, wherein either one of the first optical filter and the second optical filter is attached to the lens.

14. The method of claim 13, wherein either one of the first optical filter and the second optical filter is a coating on the lens.

15. The method of claim 9, wherein the fiber is a pigtail fiber.

16. The method of claim 9, wherein the fiber includes at least two cores, one for a C-Channel and the other for a R-Channel.

17. The optical apparatus of claim 1, wherein the second optical filter is a coating layer partially coated on the second side of the first lens.

* * * * *